Patented Feb. 2, 1943

2,309,661

UNITED STATES PATENT OFFICE 2,309,661

PROCESS OF PREPARING GUANAMINES

Daniel Elmer Nagy, Stamford, Conn., assignor to American Cyanamid Company, New York, N. Y., a corporation of Maine No Drawing. Application August 30, 1941, Serial No. 409,128

8 Claims. (Cl. 260—248)

This invention relates to an improved process of preparing guanamines in which the 2-carbon atom of the 4,6-diamino-1,3,5-triazine ring contains as the substituent group a carboxylic acid amide which may be either aliphatic or aromatic and referred to in this specification and claims as carbamylguanamines.

In the copending application of Thurston and Nagy, Serial No. 409,132, filed Aug. 30, 1941, there are described and claimed carbamylguanamines and a process of making them by reaction of a biguanide with an ester amide of a dicarboxylic acid. The process claimed is effective and gives good yields but the ester amides are sometimes expensive.

I have found that the carbamylguanamines may be prepared from the corresponding substituted imides of the dibasic acids preferably using a metal alkoxide as a catalyst. A large number of substituted imides are known and can be readily prepared and the process of the present invention, therefore, opens up a wide new field of raw materials for the production of a large number of carbamylguanamines.

The reactions are preferably carried out in solution in a suitable organic solvent among which the lower aliphatic alcohols give the best results. Particularly effective members are methanol, ethanol, ethyl ether of ethylene glycol, and the like. Methanol is very cheap, an excellent solvent for biguanide and is the preferred alcohol.

The reaction proceeds rapidly at room temperature in some cases and in others it is desirable to heat gently on a water bath. The invention will be described in greater detail in conjunction with the following specific examples. The parts are by weight.

Example 1

β-N-Phenylcarbamylpropionoguanamine

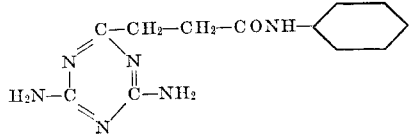

To 12 parts of biguanide dissolved in 60 parts of methanol was added 17.5 parts of succinanil. Precipitation which occurred rapidly gave the guanamine melting at 202–203° C. in about 93% yield. The product was soluble in dilute acid, hot ethanol, but insoluble in water, dilute alkali and cold ethanol.

Example 2 o-Carbamylbenzoguanamine

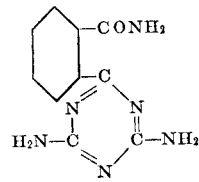

Twenty-five parts of biguanide dissolved in 100 parts of methanol was added to 35.5 parts of phthalimide and 5.5 parts of sodium metal dispersed in 120 parts of methanol and the reaction mixture was warmed slightly in order to obtain complete solution. The precipitated product was removed by filtration and washed with a small amount of methanol and water. The yield of o-carbamylbenzoguanamine melting at 264–266° C. after recrystallization from hot water was slightly less than 60%.

What I claim is:

1. A method of preparing a carbamylguanamine which comprises reacting a biguanide and an imide of a dicarboxylic acid.

2. A method of preparing a carbamylguanamine which comprises reacting biguanide and an imide of a dicarboxylic acid.

3. A method of preparing a carbamylguanamine which comprises reacting a biguanide and an imide of a dicarboxylic acid in the presence of a metal alkoxide.

4. A method of preparing a carbamylguanamine which comprises reacting biguanide and an imide of a dicarboxylic acid in the presence of a metal alkoxide.

5. A method of preparing o-carbamylbenzoguanamine which comprises reacting phthalimide and biguanide in the presence of an alkali metal alkoxide.

6. A method of preparing β-N-phenylcarbamylpropionoguanamine which comprises reacting succinanil and biguanide.

7. A method according to claim 1 in which the reaction takes place in solution in a lower monohydric paraffin alcohol.

8. A method according to claim 2 in which the reaction takes place in solution in a lower monohydric paraffin alcohol.

DANIEL ELMER NAGY.